Patented Nov. 18, 1952

2,618,650

UNITED STATES PATENT OFFICE 2,618,650

MANUFACTURE OF AMYL NITRATE

James B. Hinkamp, Detroit, and Roy Sugimoto and Harry R. Dittmar, Royal Oak, Mich., assignors to Ethyl Corporation, New York, N. Y., a corporation of Delaware No Drawing. Application June 24, 1950,
Serial No. 170,264

4 Claims. (Cl. 260—467)

This invention relates to a process for the nitration of monohydric alcohols. In particular, our invention is in a process for the manufacture of amyl nitrate.

The nitrate esters of monohydric alcohols have long been known to possess the property of increasing the ignition quality of diesel fuels. In particular the nitrate esters of the isomeric amyl alcohols have a combination of additional properties, such as low pourpoint, stability on storage, and appropriate flash point, which make them preferred commercial diesel fuel additives. Among the isomeric amyl nitrates, those derived from the primary amyl alcohols are superior to those derived from secondary and tertiary amyl alcohols both in stability and effectiveness. Heretofore such nitrate esters could not be manufactured on a commercial scale by a process which was economical and which provided a product of sufficient quality for commercial application.

Among the several difficulties attending the nitration of alcohols which prior processes have attempted to overcome is the ease with which the alcohols employed are consumed in side reactions by the nitrating mixture employed. Such side reactions not only decrease the yield of nitrate obtainable from the alcohol and decrease the quality of the product, but may be so extensive as to cause the reaction to become uncontrollable and hazardous. Among the remedies proposed for offsetting such side-reactions are the addition of considerable quantities of urea, operation at extremely low temperatures, continuous distillation of the product with water or at low pressures, or a combination of these devices. All these methods are costly, and result in additional disadvantages such as elaborate process equipment, slow reaction and impure product.

Many prior processes for the nitration of alcohols specify mixtures of nitrating agents intended to control the reaction. The use of mixtures of sulfuric acid and nitric acids is the most common practice in the nitration art, but heretofore the use of sulfuric acid, as in "mixed acid," has led to two serious complications. In the first instance the activating effect of the sulfuric acid has been such that it was always necessary to employ one or more of the devices enumerated above to moderate the reaction. In the second instance the use of such mixed acids has resulted in a reaction mixture from which the product can be recovered only with difficulty, because of high solubility and the formation of stable emulsions. Among the proposed remedies for this separation problem are dilution of the reaction mixture followed by an azeotropic distillation, and continuous distillation from the reactor of the product. Both of these remedies result in poor recoveries of alkyl nitrate either through decomposition or solubility effects, and further increase the cost of the materials so-produced.

In attempts to moderate the reactivity of the mixed acid and increase the separability of the reaction mixture it has been proposed to employ large excesses of nitric acid. The separation problem is sufficiently great that further proposals have been made to sacrifice yield and fast reaction by using large excesses of nitric acid in the absence of sulfuric acid. However, when such nitrating mixtures are employed, the water formed as a by-product so retards the esterification reaction that the oxidation reaction becomes significant and a commercially successful operation cannot be achieved. In order to speed the desired reaction under such conditions it has been proposed that the nitrating mixture be fortified during the nitration with fresh or recovered nitric acid. This operation is wasteful of nitric acid and requires an elaborate recovery system. Furthermore, in processes wherein large excesses of nitric acid are employed the nitrate ester requires further treatment to render it stable on storage.

It, therefore, is an object of our invention to provide a process for the nitration of monohydric alcohols which overcomes these disadvantages of the prior art. In particular it is an object of our process to manufacture amyl nitrate by a continuous operation wherein moderate temperatures are employed. It is a further object to provide an easily recoverable amyl nitrate product of high purity which is stable. A still further object of the process of our invention is to nitrate amyl alcohol under conditions whereby it is not necessary to recover nitric acid and whereby a minimum amount of sulfuric acid is required. Our invention further provides a safe nitration process wherein it is not necessary to quench, drown or otherwise stop the reaction before completion, and wherein costly chemical modifiers are not required. Still further objects of our invention will be apparent from the further description of our process hereinafter.

According to the present invention monohydric alcohols are nitrated with mixed nitric-sulfuric acid containing 20 to 33 percent nitric acid, 60 to 68 percent sulfuric acid and 7 to 14 percent water at a temperature between about 0° C. and 20° C. We prefer to employ the process of our invention in the nitration of primary alcohols. However, we can tolerate up to about 20 percent secondary alcohols, and up to about 1 percent tertiary alcohols in admixture with the primary alcohols.

By employing sulfuric acid in concentration between 60 and 68 percent and with not more than 14 percent water, we have found that the water present in the final esterification mixture can be adequately bound by the sulfuric acid. Therefore, the esterification reaction occurs exclusively and at a rapid rate, oxidation by nitric acid is completely eliminated, and urea, or other chemical modifier, is unnecessary. However, we have found that if the amount of nitric acid employed is below the amount required to nitrate the alcohol, oxidation reactions occur. Thus, we prefer to maintain a small but critical excess of nitric acid to alcohol of between about 0 and 13 percent. All acid compositions and proportions of mixed acid to alcohol within this range are satisfactory, provided the molar ratio of water to sulfuric acid in the spent acid is not more than 1.9, or 0.35 part by weight of water per part of sulfuric acid.

Although the reaction proceeds smoothly with mixed acid containing somewhat less than 20 percent nitric acid, the separation of the product from the spent acid is complicated. Since amyl nitrate is somewhat soluble in concentrated sulfuric acid solutions, the use of 14-75 mixed acid, such as is used in the manufacture of nitroglycerine, complicates the separation of the product from the spent acid. Mixed acid containing 33 percent nitric acid is the upper practical limit, as this is the highest concentration of nitric acid which can be obtained from readily available commercial acids. For example, to make mixed acid containing appreciably more than 33 percent nitric acid from 65 percent oleum, which is available commercially, would require a nitric acid containing more than 70 percent nitric acid. Such nitric acid is not available in large quantities at a price comparable to commercial nitric acid (67%). The use of $SO_3$, on the other hand, would introduce complications in handling procedures.

The reaction mixture of our invention is chemically stable. That is, the proportions of reactants is such that after reaction has occured, the reaction mixture can be allowed to stand for long periods at 10° C. and no decomposition, further reaction, or "fuming off" will occur. Therefore, it is not necessary to add urea to decompose nitric oxides, or to stop the reaction by sudden dilution with water or ice.

We prefer to employ our process as a continuous operation, because of the significant economies inherent in such a method. However, because of the stability of the reaction mixture as described above, a batch operation can be conducted without introducing other complications. In a continuous operation, the residence time, or contact time, of reactants and products can, as noted above, be as long as desired. The minimum duration of the residence time has never been determined, and is dependent solely upon the heat removing capacity available and upon the facilities for handling the liquid materials. For example we have achieved successful operation with a residence time as high as 5 minutes, and as little as 0.6 minute, or lower. For a commercial process this factor is extremely significant, for the desired production capacity can be varied over wide limits in a single reaction and recovery system, merely by controlling the flow of reactants and coolant. Thus, our process is extremely flexible.

The size of the reactor employed in our process in relation to the output capacity is primarily dependent on the provisions for agitation and cooling. That is, at a given throughput the size of the reactor controls the residence or contact time. As stated above, the minimum contact time is not critical, so that the body of the reaction mixture functions primarily as a means for dispersing the reaction heat. Therefore, the quantity of such reaction mixture at a given throughput required to maintain the desired temperature depends solely on the means supplied for removing the reaction heat and not on the residence time requirements.

Likewise, our process will operate successfully over a wide temperature range. For practical purposes, we prefer to operate at a temperature sufficiently high to maintain all the reaction mixture in a free-flowing liquid state. The upper temperature limit is dependent both on the efficiency of the agitating means and the composition of the alcohol being nitrated. It is well known that secondary alcohols require a lower temperature for smooth nitration than primary alcohols. Thus, when nitrating a mixture of alcohols we prefer to lower the temperature of nitration as the concentration of secondary alcohols is increased. For example, with as much as 20 percent secondary alcohol and 1 percent tertiary alcohol, we prefer to maintain the reaction temperature below about 5° C., while with pure primary alcohol we can operate satisfactorily in the neighborhood of 20° C. Thus, our preferred temperature range is between about 0° C. and 20° C.

The method of addition of the reactants in our process is not critical. For a smooth continuous operation we prefer to add the acid and alcohol continuously at a steady rate, although for some purposes intermittent addition of one or more streams may be desired. It is not essential that the sulfuric and nitric acids be premixed before introduction to the reactor, although we prefer this method of addition in order to minimize the mixing requirements imposed on the reactor agitator, and to remove the heat of mixing prior to conducting the nitration reaction. Likewise, it is not necessary to precool the liquid reactants before introduction to the reactor. For example, at a low or medium output from a given reactor system the alcohol and acid may be introduced at or near the prevailing atmospheric temperature and maintain at all times a controlled, efficient reaction. At high outputs it may be desirable to precool one or more of the reactants to reduce the heat transfer requirements of the cooling system of the reaction zone.

One preferred method of introducing the reactants to the reactor system is to add separately the alcohol and the mixed acid as a steady stream to the stirred reaction mixture, such that the streams are delivered near the surface of the liquid. Alternatively, either or both of these streams may be delivered below the surface of the liquid at any desired depth, either in a single stream, a jet impinging on the agitator, or as dispersed droplets. We prefer to maintain the two liquid phases of the reaction mixture, that is the phase consisting predominantly of alkyl nitrate and the phase consisting predominantly of spent acid, in a fine dispersion, rather than as two distinct layers. Thus, heat transfer is facilitated and the development of local zones of high temperature is avoided.

To recover the nitrate product from the process of our invention we prefer to continuously deliver the reaction mixture to a settling chamber, permit the layers to separate by gravity, and continuously withdraw from such settling chamber the upper product layer and the lower spent-acid layer. Other methods of separation can also be employed without departing from the scope of our invention, for example, continuous centrifugation, solvent extraction or distillation. It is, however, a feature of our invention that such costly operations are not required to obtain a commercially acceptable pure product. It is a special feature of our process that urea is not required in the reaction mixture, as urea reacts with nitric acid to yield gaseous products which contribute to the tendency of prior processes to form more or less stable emulsions, a major factor in complicating the separation step and reducing the yield. By the above-described separation method a product is obtained which may have a cloudy appearance, due to a trace of dispersed aqueous-acid phase. This can be removed, to produce a clear product by several conventional methods. We prefer to first wash the crude product with soda ash to neutralize the traces of dispersed spent acid, and then percolate the product through a tower containing a solid absorbent, such as Filtrol or silica gel. A second advantage of this step is that occasionally a straw-colored product is obtained which is made substantially water-white by such treatment. The product obtained by our process contains about 99 percent alkyl nitrate.

By the above-described treatment the alkyl nitrate product is obtained in high yield, of the order of 95 percent of the alcohol introduced to the reactor. This excellent yield can be further increased if a small amount of water is added to the reaction mixture before passing to the settler. This water need not exceed about 5 percent, by volume, of the total reaction mixture.

The process of our invention can be further understood by reference to the following examples, which, while referring to the nitration of a mixture of isomeric amyl alcohols, is not intended to limit the scope of our invention, as our process is capable of wide application to the nitration of primary monohydric alcohols, and to mixtures of monohydric alcohols containing not more than 20 percent secondary alcohols and not more than 1 percent tertiary alcohols. Unless stated otherwise, in the examples that follow all percentages and parts are by weight.

Example I

To a stainless steel open reactor, equipped with an efficient agitator, internal cooling coil and means for recording the temperature of the reactants, a continuous stream of amyl alcohol was introduced below the surface of the agitated liquid and mixed acid was continuously introduced at a point about one-third the depth of the agitated liquid. The reactor was further provided with an overflow tube by means of which the liquid level was maintained constant. The amyl alcohol employed in this example consisted largely of mixed primary amyl alcohols, 92.3 percent, with a minor proportion of secondary amyl alcohols, 3.2 percent, and the other constituents were largely diamyl ether and water. The mixed acid composition was 26 percent nitric acid, 60 percent sulfuric acid and 14 percent water. The reaction mixture was maintained at a temperature of 5 to 6° C. The dispersed reaction mixture was continuously discharged by overflow into to a separator tank containing a simple one-plate baffle, a cooling coil, an overflow line for the upper stratum and a discharge line for the lower stratum. The upper product layer overflowed into a vessel equipped with an agitator and a delivery line for addition of 10 percent soda ash solution, and a discharge line to a second separator. The upper stratum from the second separator overflowed to the top of a tower packed with Filtrol. The product was withdrawn continuously from the bottom of this tower. To determine the yield and recoveries of the reactants and products, measurements were made on the streams over a period of 15 minutes. During this period 1156 parts of amyl alcohols were introduced and 3506 parts of mixed acid. This quantity of mixed acid contained 6 percent excess nitric acid over that required to completely esterify the alcohols present in the feed. The contact time of the material in the reactor was 3 minutes. The yeild of product was 1684 parts for a conversion of amyl alcohols to amyl nitrates of 96.6 percent.

Example II

In an operation similar to that described in Example I, the same amyl alcohol feed stream was employed, but with a mixed acid composition of 20 percent nitric acid, 68 percent sulfuric acid, and 12 percent water. During a 20-minute period 1300 parts of amyl alcohols and 5346 parts of mixed acid were introduced into the reactor. The quantity of nitric acid so-introduced was 6 percent in excess of that required to esterify the alcohols introduced. The conversion of amyl alcohols to amyl nitrates was 97.4 percent.

Example III

In another operation similar to Example I, 1037 parts of amyl alcohols and 3865 parts of mixed acid of the same composition as the mixed acid of Example II were employed during a period of 15 minutes. The quantity of nitric acid employed in this operation was slightly in excess of the quantity of alcohol introduced. In this example the conversion of amyl alcohols to amyl nitrates was 94.3 percent.

In a series of operations wherein the quantities and proportions of reactants were as enumerated in Example II, the contact time was reduced over the range of 5.0 minutes to 0.6 minute, comprising a total of 10 determinations. The average conversion of amyl alcohols to amyl nitrates in this series of operations was 94.6 percent.

Three additional operations further illustrate the process of our invention. By a procedure similar to Example I, but employing mixed acids comprising 26, 30 and 33 percent nitric acid, 64.5, 62.1 and 60.4 percent sulfuric acid, and and 9.5, 7.9 and 6.6 percent water, respectively, we obtained 91.5, 93.2 and 89.2 percent conversions of amyl alcohols to amyl nitrates, respectively.

Contrary to results obtained by the procedure of the foregoing examples, when we employed a mixed acid containing only 14 percent nitric acid with 75 percent sulfuric acid and 11 percent water at a temperature of 17° C., the reaction was difficult to control and, although the nitric acid was in 7 percent excess of requirements, only 74 percent of conversion of amyl alcohol to amyl nitrate was obtained.

Lowering the temperature to 8° C. and increasing the excess of the above-described acid to 25 percent produced only a 47 percent conversion. In this operation the viscosity of the reaction mixture was such that a good separation was not obtained.

To illustrate the importance of the interrelation between the concentration of mixed acid and the ratio of nitric acid to alcohol in the process of our invention, a series of operations was conducted according to the procedure of Example I wherein a mixed acid comprising 26 percent nitric acid, 60 percent sulfuric acid and 14 percent water was employed. The feed ratio of acid to alcohol was varied so that in each operation the excess of nitric acid to alcohol was 13, 9, 7 and 5 percent. The ratio of water to sulfuric acid in these tests, based on complete reaction, was 0.345, 0.350, 0.352 and 0.355 part, respectively. In the first two operations the yields were 93.4 and 94.4 percent, respectively, whereas in the last two operations the oxidation was so extensive that the reaction was uncontrollable after 18 and 11 minutes, that is, when the water-sulfuric acid ratio exceeded 0.350 part by weight. With other mixed acids within the scope of our invention, for example an acid comprising 22 percent nitric acid, 65 percent sulfuric acid and 13 percent water, good yields were obtained when the excess of nitric acid to alcohol was reduced as low as zero.

The process of our invention is equally effective in producing the nitrate esters of individual members of the series of alkyl monohydric compounds. For example, we obtained good yields of material of high purity when we employed isoamyl alcohol and n-amyl alcohol.

The foregoing examples are not intended to limit the scope of our invention, as other embodiments will be apparent to those skilled in the art.

We claim:

1. A process for the nitration of amyl alcohols, said amyl alcohols consisting essentially of between 80 to 100 per cent by weight of isomeric primary amyl alcohols, of not more than 20 weight per cent isomeric secondary amyl alcohols, and of not more than 1 weight per cent tertiary amyl alcohol which comprises reacting said amyl alcohols directly with a nitration mixture consisting essentially of nitric and sulfuric acids, the nitric acid in said mixture being at least 20 per cent by weight the water in said mixture being not more than 14 weight per cent, the amount of nitric acid in said mixture being at least equal to and not more than 13 per cent in excess of the stoichiometric requirement to substantially completely esterify said amyl alcohols, and the ratio by weight of water to sulfuric acid in the final esterification mixture being not more than 0.35.

2. The process of claim 1 wherein the total isomeric amyl alcohols treated consists essentially of primary amyl alcohol.

3. The process of claim 1 wherein the total amyl alcohol treated consists essentially of isoamyl alcohol.

4. The process of claim 1 wherein the total amyl alcohol treated consists essentially of n-amyl alcohol.

JAMES B. HINKAMP.
ROY SUGIMOTO.
HARRY R. DITTMAR.

REFERENCES CITED

The following references are of record in the file of this patent:

UNITED STATES PATENTS

| Number | Name | Date |
|--------|------|------|
| 913,653 | Aigner | Feb. 23, 1909 |
| 1,686,344 | Rinkenbach | Oct. 2, 1928 |

FOREIGN PATENTS

| Number | Country | Date |
|--------|---------|------|
| 2,776 of 1905 | Great Britain | Feb. 8, 1906 |
| 352,486 | France | June 2, 1905 |

OTHER REFERENCES

Champion, "Comptes Rendus Acad. Sci.," vol. 78 (1874), pp. 1150 to 1152.